United States Patent
Shahparnia (10) Patent No.: US 10,042,486 B1
(45) Date of Patent: Aug. 7, 2018

(54) DYNAMIC DEMODULATION WAVEFORM ADJUSTMENT FOR TONAL NOISE MITIGATION

(71) Applicant: Apple Inc., Cupertino, CA (US)

(72) Inventor: Shahrooz Shahparnia, Campbell, CA (US)

(73) Assignee: Apple Inc., Cupertino, CA (US)

( * ) Notice: Subject to any disclaimer, the term of this patent is extended or adjusted under 35 U.S.C. 154(b) by 237 days.

(21) Appl. No.: 14/515,390

(22) Filed: Oct. 15, 2014

Related U.S. Application Data (60) Provisional application No. 61/893,073, filed on Oct. 18, 2013.

(51) Int. Cl.
| | | |
|---|---|---|
| G06F 3/044 | (2006.01) | |
| G06F 3/0488 | (2013.01) | |
| G06F 3/05 | (2006.01) | |
| G06F 3/06 | (2006.01) | |

(52) U.S. Cl.
CPC ............ G06F 3/044 (2013.01); G06F 3/0488 (2013.01); G06F 3/05 (2013.01); G06F 3/06 (2013.01)

(58) Field of Classification Search
CPC ...... G06F 3/044; G06F 3/0416; G06F 3/0418; G06F 2203/04104; G06F 3/03545
USPC .................................................. 345/173–174
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 * | 11/2001 | Westerman | G06F 3/0235 345/173 |
| 6,690,387 B2 | 2/2004 | Zimmerman et al. | |
| 7,015,894 B2 | 3/2006 | Morohoshi | |
| 7,031,886 B1 * | 4/2006 | Hargreaves | G06F 3/0418 375/350 |
| 7,184,064 B2 | 2/2007 | Zimmerman et al. | |
| 7,663,607 B2 | 2/2010 | Hotelling et al. | |
| 8,305,352 B2 | 11/2012 | Wu et al. | |

(Continued)

FOREIGN PATENT DOCUMENTS

| | | |
|---|---|---|
| JP | 2000-163031 A | 6/2000 |
| JP | 2002-342033 A | 11/2002 |
| WO | WO-2016/032704 A1 | 3/2016 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Kent Chang
*Assistant Examiner* — Sujit Shah
(74) *Attorney, Agent, or Firm* — Morrison & Foerster LLP (57) ABSTRACT

A touch controller on a touch sensitive device configured to generate a dynamic demodulation waveform so as to minimize the effects on a signal to noise ratio caused by a tonal noise is disclosed. The demodulation waveform can be turned off for finite durations so as to minimize the probability that a transitional voltage of the tonal noise source is included in the demodulation result.

23 Claims, 6 Drawing Sheets

(56) References Cited

U.S. PATENT DOCUMENTS

| | | | |
|---|---|---|---|
| 8,479,122 B2 | 7/2013 | Hotelling et al. | |
| 2006/0197753 A1 | 9/2006 | Hotelling | |
| 2007/0257890 A1* | 11/2007 | Hotelling | G06F 3/0418 345/173 |
| 2008/0150918 A1* | 6/2008 | Hagen | G06F 3/046 345/179 |
| 2010/0059295 A1* | 3/2010 | Hotelling | G06F 3/044 178/18.06 |
| 2011/0042152 A1* | 2/2011 | Wu | G06F 3/0416 178/18.03 |
| 2011/0061948 A1* | 3/2011 | Krah | G06F 3/0418 178/18.01 |
| 2011/0063227 A1* | 3/2011 | Wu | G06F 3/0416 345/173 |
| 2011/0210939 A1* | 9/2011 | Reynolds | G06F 3/0418 345/174 |
| 2011/0210941 A1* | 9/2011 | Reynolds | G06F 3/0418 345/174 |
| 2012/0306801 A1* | 12/2012 | Rai | G06F 3/0416 345/174 |
| 2013/0176272 A1* | 7/2013 | Cattivelli | G06F 3/041 345/174 |
| 2014/0267086 A1 | 9/2014 | Yousefpor et al. | |
| 2015/0035797 A1 | 2/2015 | Shahparnia | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action dated Oct. 3, 2017, for U.S. Appl. No. 15/191,614, filed Jun. 24, 2016, fourteen pages.

\* cited by examiner

DYNAMIC DEMODULATION WAVEFORM ADJUSTMENT FOR TONAL NOISE MITIGATION

FIELD OF THE DISCLOSURE

This relates generally to the shaping/adjustment of a demodulation waveform in order to mitigate tonal noises on an electronic device.

BACKGROUND OF THE DISCLOSURE

Many types of input devices are available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens generally allow a user to perform various functions by touching (e.g., physical contact or near-field proximity) the touch sensor panel using a finger, stylus or other object at a location often dictated by a user interface (UI) being displayed by the display device. In general, touch screens can recognize a touch event and the position of the touch event on the touch sensor panel, and the computing system can generate touch images and then interpret the touch images in accordance with the display appearing at the time of the touch event, and thereafter can perform one or more actions based on the touch image.

Electronic devices in general can be susceptible to tonal noises that can be coupled to the device via proximal electronics such as an external charger. In the instance of a touch input device, tonal noise can generate a "false touch" on the screen; in other words, the device will determine that a touch or proximity event has occurred when none exists. In some cases, these tonal noises can additionally or alternatively cause error(s) in touch position calculations, such as jittering of the touch position with time, that can cause inaccuracies in touch input when accurate touch position calculation is important (e.g., when user input elements are spaced close together on the screen, such as in an on-screen keyboard). Furthermore, tonal noise can also cause a device to ignore an actual touch or proximity event. For example, mutual capacitance touch sensor panels can be formed from a matrix of drive and sense lines of a substantially transparent conductive material such as Indium Tin Oxide (ITO). The lines are often arranged orthogonally on a substantially transparent substrate. Tonal noise can be coupled into the matrix of drive lines and sense lines, causing signals to appear that can be misinterpreted as a touch or proximity event. Also, tonal noise can be coupled into the matrix of drive and sense lines causing signals to appear as negative touches, such that when a real touch occurs, it is not detected. The false touches or undetected touches can lead to an overall degradation of the user experience in that the device will register touches that the user did not intend, and furthermore, may fail to recognize actual touches intended by a user of the device.

SUMMARY OF THE DISCLOSURE

This relates to a touch input device that can dynamically adjust a demodulation waveform in response to a detected tonal noise such that the performance degradation caused by the tonal noise can be minimized.

A demodulation waveform can be adjusted such that the probability that a transitional edge of a tonal noise waveform is included in the final demodulated signal is decreased.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to the use of a dynamic demodulation waveform to minimize the degradation to a signal to noise ratio (SNR) caused by tonal noise that is coupled into a touch sensor panel from, for example, electronics proximal to the device. Noise from an LCD, an AC adapter, and other sources can be tonal noises. When a tonal noise source is detected, the device can adjust a demodulation waveform to minimize the likelihood that a transitional edge of the tonal noise source is included in the accumulated demodulation result. It is understood that tonal noises, as used in this disclosure, can refer generally to any periodic and/or repeating noise waveforms.

Although examples disclosed herein may be described and illustrated herein in terms of mutual capacitance touch sensor panels, it should be understood that the examples are not so limited, but are additionally applicable to self-capacitance sensor panels, and both single- and multi-touch sensor panels in which demodulation can occur. For example, a self-capacitance based touch system can include a matrix of small, individual plates of conductive material that can be referred to as touch pixel electrodes. For example, a touch screen can include a plurality of individual touch pixel electrodes, each touch pixel electrode identifying or representing a unique location on the touch screen at which touch or proximity (i.e., a touch or proximity event) is to be sensed, and each touch pixel electrode being electrically isolated from the other touch pixel electrodes in the touch panel/screen. Such a touch screen can be referred to as a pixelated self-capacitance touch screen. During operation, a touch pixel electrode can be stimulated with an AC waveform, and the self-capacitance to ground of the touch pixel electrode can be measured. As an object approaches the touch pixel electrode, the self-capacitance to ground of the touch pixel electrode can change. This change in the self-capacitance of the touch pixel electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above.

Figure 1:
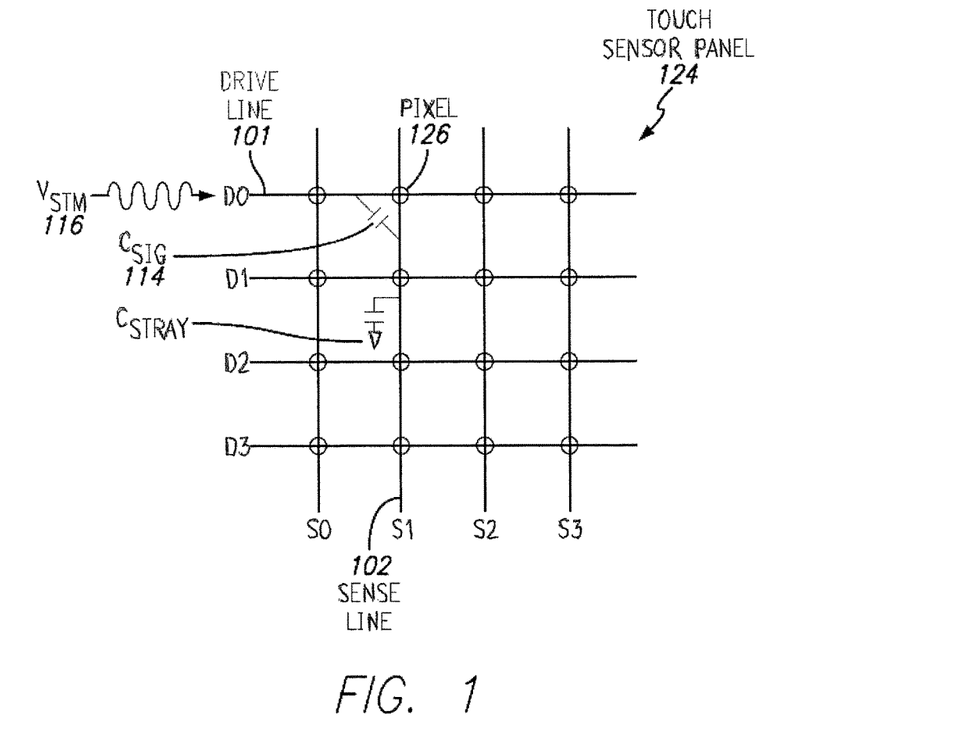
FIG. 1 illustrates an exemplary mutual capacitance touch sensor panel in a no-touch condition according to disclosed examples.

FIG. 1 illustrates an exemplary mutual capacitance touch sensor panel in a no-touch condition, i.e., when there are presently no touches at the panel, according to various examples of the disclosure. In the example of FIG. 1, touch sensor panel 124 can include an array of nodes 126 that can be formed at the crossings of rows of drive lines 101 (D0-D3) and columns of sense lines 102 (S0-S3). Each node 126 can have an associated mutual capacitance Csig 114 when the drive line 101 forming the node is stimulated with a stimulation signal Vstm 116. Each node 126 can also have an associated stray capacitance Cstray when the drive line 101 forming the node is not stimulated with a stimulation signal Vstm 116 but is connected to a DC voltage. In this example, drive line D0 can be stimulated with stimulation signal 116 (Vstm), forming mutual capacitance Csig 114 at the nodes 126 that are formed at the drive line D0 and the sense lines S0-S3 crossings. One or more drive lines 101 can be stimulated at any given time (i.e., in some examples, more than one drive line 101 may be stimulated concurrently).

Figure 2:
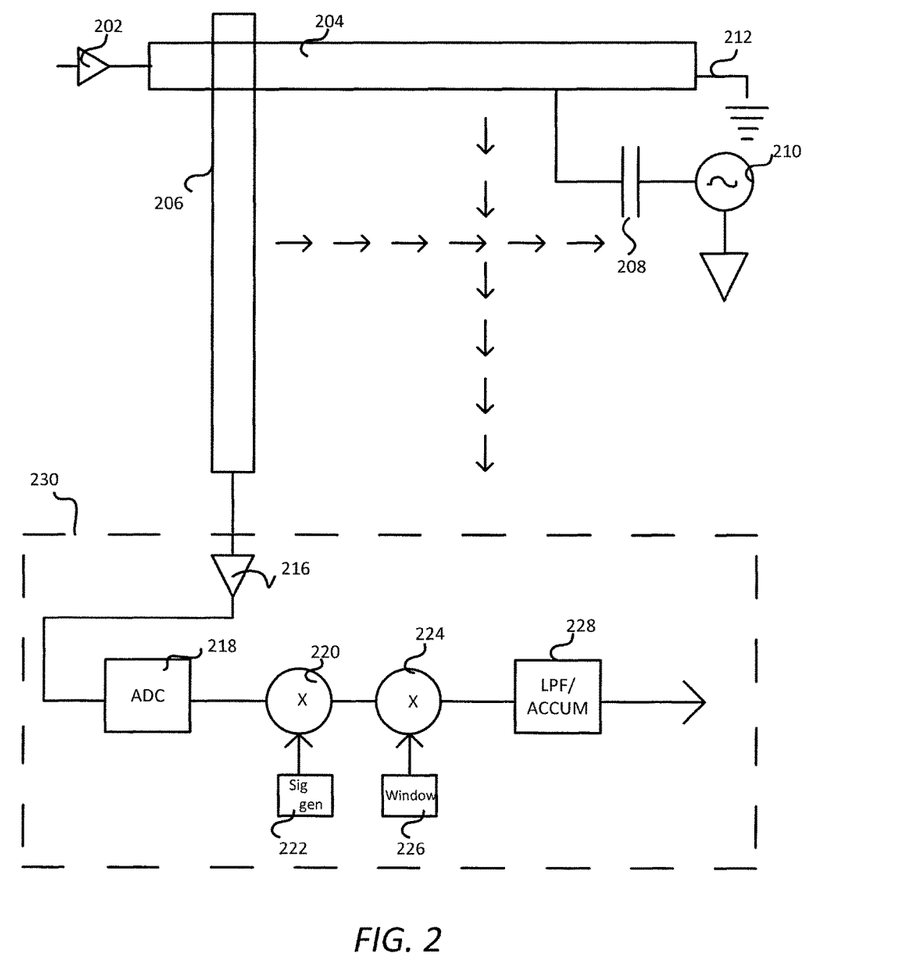
FIG. 2 illustrates an exemplary drive line and sense line pairing and their associated electronics according to examples of the disclosure.

FIG. 2 illustrates an exemplary drive line and sense line pairing and their associated electronics according to examples of the disclosure. A drive line 204 can be capacitively coupled to a sense line 206. The drive line 204 can be coupled to multiple sense lines, and likewise a sense line 206 can be coupled to multiple drive lines; however, for the purpose of illustration, only one such pairing is illustrated. The drive line 204 can be stimulated with an AC or DC voltage source by stimulation circuitry 202, as described above. As described above, a portion of the stimulation signal transmitted by the drive line 204 can be capacitively coupled to sense line 206. When a finger or other external object comes into contact with or in close proximity to the drive line/sense line pairing (i.e., touch node), the amount of signal coupled between drive line 204 and sense line 206 can change. This change can be detected by sense circuitry 230 that can be coupled to each sense line such as sense line 206. Analogously, in the case of a self-capacitance touch sensor panel, sense circuitry 230 can detect the change in the self-capacitance of a self-capacitance touch electrode (e.g., touch pixel electrode) caused by a finger or other object being in contact with or in proximity to the self-capacitance touch electrode.

Sense circuitry 230 can include analog front end circuitry 216 for performing analog signal processing functions such as buffering. The data collected from the sense line 206 can then be converted to a digital signal via analog-to-digital converter (ADC) 218. The output of ADC 218 can then be mixed by mixer 220 with a signal generated by a signal generator 222. The signal generated by the signal generator can be used to perform homodyne mixing on the signal in order to frequency shift the incoming signal into a baseband signal. The output of mixer 220 can then be inputted into mixer 224 in which a windowing function provided by window generator 226 can be mixed with the signal. The output of mixer 224 can then be fed into an accumulator 228, which can act as the digital equivalent of a low pass filter.

In some examples, proximal electronics, such as an AC adapter used to charge the device, can cause interference with the sense circuitry. As illustrated in FIG. 2, proximal electronics can act as a noise source 210 that can be capacitively coupled to the touch sensor panel through 208. In some examples, the noise source 210 can provide a tonal periodic signal that can ultimately be coupled into the sense line 206 via drive line 204. Noise source 210 can similarly be coupled to a self-capacitance touch electrode in a self-capacitance touch sensor panel.

Figures 3A, 3B:
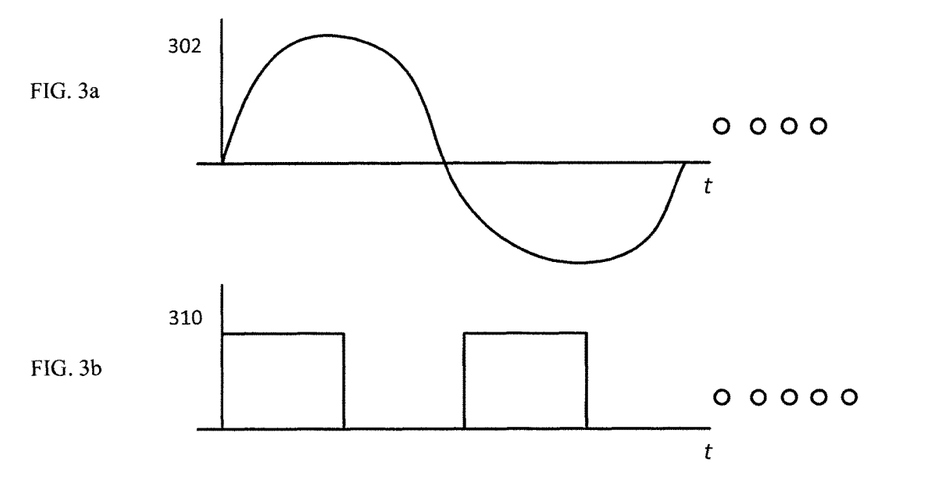
FIGS. 3a-d illustrate various signals found in the circuit depicted at FIG. 2.
Figure 3C:
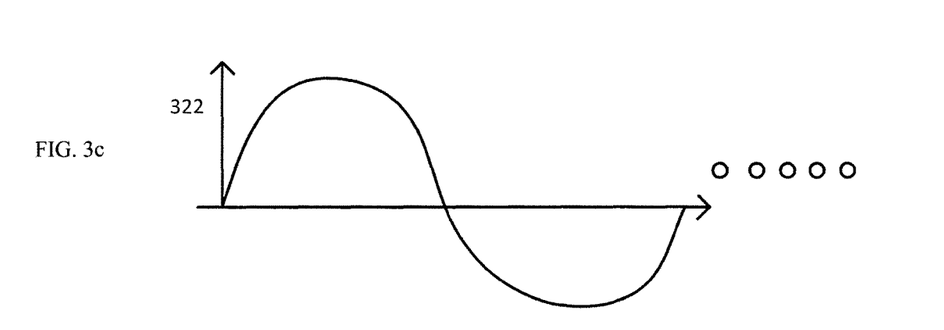

FIGS. 3a-d illustrate various signals found in the circuit depicted at FIG. 2, according to examples of the disclosure. FIG. 3a illustrates an example signal 302 that can be transmitted by stimulation circuitry 202 of FIG. 2 to drive line 204. The signal 302 can be an AC sinusoidal signal of a certain frequency (denoted as $f_{stim}$) and amplitude. FIG. 3c illustrates an example signal 322 that can be used as a demodulation waveform. The signal 322 can be generated by signal generator 222 of FIG. 2. The signal 322 can by synchronized with signal 302 of FIG. 3a such that the two signals can have the same frequency (denoted as $f_{demod}$) and phase in order to achieve homodyne mixing of the signal received by mixer 220. Though the examples of the disclosure may be described with reference to signals 302 and 322 being synchronized and having the same frequency, it is understood that this need not be the case, and the scope of the disclosure is not so limited. For example, the examples of the disclosure may implement I/Q demodulation in which $f_{stim}$ (frequency of signal 302) may be equal or close to $f_{demod}$ (frequency of signal 322) such that perfect synchronization of signals 302 and 322 may not be required. FIG. 3b illustrates an example tonal noise signal 310, such as one produced by noise source 210 of FIG. 2. The tonal noise signal 310, in this example, can be a periodic square wave of a certain frequency (denoted as $f_{noise}$) and amplitude.

Figure 3D:
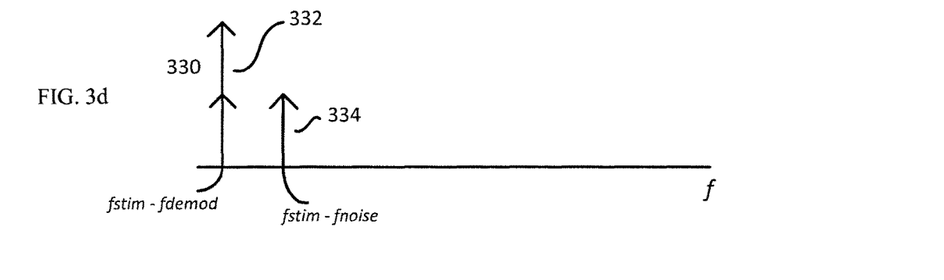

After both the coupled stimulation signal 302 and the tonal noise 310 are mixed with the demodulation waveform 322 at mixer 220 in FIG. 2, the frequency response of the resultant signal can appear as depicted in FIG. 3d. As illustrated, frequency response 330 can have two signals. The first signal, depicted at 332, can represent the mixture of the stimulation signal 302 and the demodulation waveform 322. The frequency of the signal 332 can be the difference between the stimulation frequency $f_{stim}$ and the demodulation $f_{demod}$. In the case where $f_{stim}$ and $f_{demod}$ are the same frequency, the signal 332 can be a DC signal. The second signal, depicted at 334, can represent the mixture of the tonal noise signal 310 and the demodulation waveform 322. The frequency of the signal 334 can be the difference between the stimulation frequency $f_{stim}$ and the noise frequency $f_{noise}$.

If signal 334 is close enough in frequency to signal 332, during the accumulation that takes place at accumulator 228 in FIG. 2, the energy of signal 334 can be included in the accumulator result. This can lead to a degradation of the signal-to-noise ratio for the touch sensor panel.

Figure 4A:
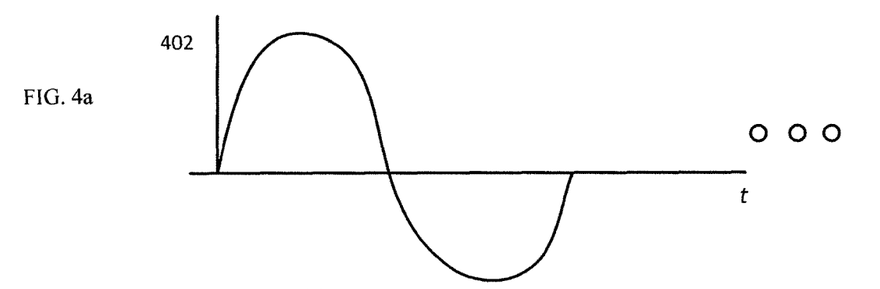
FIGS. 4a-d illustrate various signals found in the circuit depicted at FIG. 2 when a dynamic demodulation waveform is utilized.
Figure 4B:
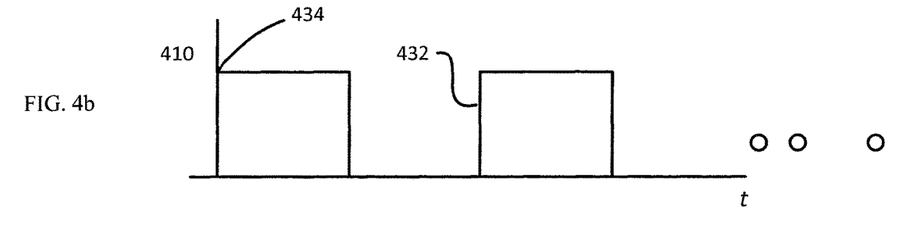
Figure 4C:
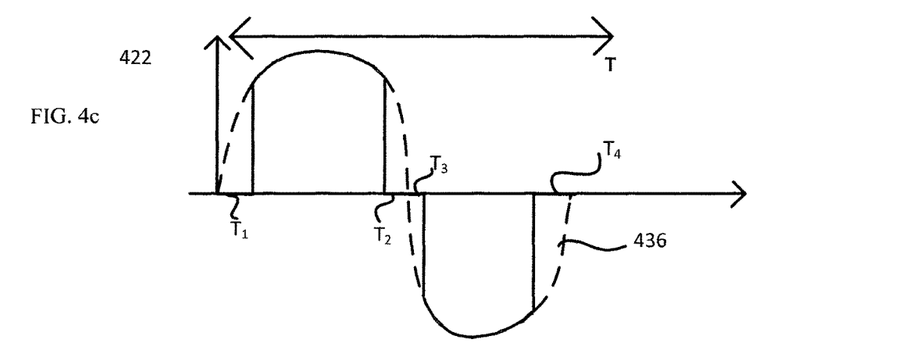

FIGS. 4a-d illustrate various signals found in the circuit depicted at FIG. 2 when a dynamic demodulation waveform is applied. FIGS. 4a and 4b (and signals 402 and 410) can be identical to FIGS. 3a and 3b (and signals 302 and 310) discussed above. FIG. 4c can illustrate an exemplary dynamically adjusted waveform 422 according to examples of the disclosure. The waveform 422 can be similar to the waveform 322 depicted in FIG. 3c, except the signal can be turned "off" (i.e., held at substantially 0V) for one or more durations (in some examples, predetermined durations). The durations during which waveform 422 can be turned off can be durations during which the waveform has relatively low signal energy, and the durations during which the waveform can be turned on can be durations during which the waveform has relatively high signal energy (e.g., between π/2 and 3π/4 and between 3π/2 and 7π/4 for a sine-based waveform). Dashed line 436 illustrates a "standard demodulation waveform," such as waveform 322 illustrated in FIG. 3c, and is only depicted in FIG. 4c so as to provide a comparison with the dynamically adjusted demodulation waveform 422. With respect to the "standard demodulation waveform," during time period T1, the dynamic waveform 422 can be turned "off". When the period ends, the dynamic waveform 422 can be turned back on to the value it would have had had the waveform not been turned off. This process can repeat at T2, T3, T4 and so on.

The results produced by using a dynamic waveform, such as the one described above, for demodulating touch signals will now be described. A tonal noise signal, such as the one depicted in FIG. 4b at 410, can degrade the touch system's signal-to-noise ratio (SNR) due to transitional voltages that may exist in the tonal noise signal, such as those depicted at 434 and 432. By selectively turning on and off the demodulation waveform 422, the probability that a transitional edge of the tonal noise (e.g., edges 432 and 434) will be mixed into the demodulation result can be reduced. As depicted, if a transitional edge of the tonal noise waveform coincides with a period of time when the demodulation waveform is turned off (e.g., T1), then the effect of the edge may not be included in the demodulation result.

The probability that a transitional edge will be included in a demodulation result can be a function of a duration during which the demodulation waveform is "turned off." As an example, if the probability that a transitional edge appears in the tonal noise waveform is uniform over time, and if during one integration period T there are four periods of time T1-T4 during which the demodulation waveform is turned off, as depicted in FIG. 4c, assuming that T1, T2, T3 and T4 are of equal duration, then the probability that a transitional edge will be included in the demodulation result can be expressed as:

$$[T-4*T1]/T \tag{1}$$

where T equals one integration period, and T1 represents the duration of one "off" period of the demodulation waveform. As is evidenced by equation 1, the longer the "off" periods are in duration, the less likely it is that a transitional edge of the tonal noise waveform will be included in the demodulation result. It is understood that dynamic waveform 422 is provided by way of example only, and other dynamic waveforms that reduce the probability that a transitional edge of a tonal noise will be included in a demodulation result are also within the scope of the disclosure.

Figure 4D:
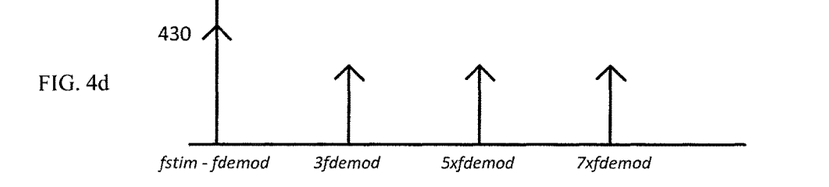

As illustrated in FIG. 4d, using a dynamic demodulation waveform (e.g., waveform 422) can have an impact on the frequency content of the demodulation result 430. Similar to FIG. 3d, the stimulation signal can be mixed with the dynamic demodulation waveform 422 to produce a signal with a frequency of $f_{stim}-f_{demod}$. However, unlike FIG. 3d, because the dynamic demodulation waveform has periods during which it is turned off, susceptibility bands may appear at harmonic frequencies of the demodulation waveform frequency, as illustrated. These harmonic waveforms may increase or decrease based on the durations of T1-T4, and thus may act as a constraint on the value of T1. Furthermore, as T1 is increased, there may be signal loss at the demodulation waveform which could also act as a constraint on T1.

It is understood that while the examples of the disclosure have been provided in the context of turning on and off the demodulation waveform during certain durations of time, other methods can be used to achieve the same or similar results. For example, the demodulation waveform can be ignored or otherwise selectively prevented from affecting the mixed signal during the certain durations of time, and/or the result of the demodulation waveform (e.g., the mixed signal resulting from mixing the demodulation waveform with another waveform (e.g., a touch signal)) can be ignored during the certain durations of time. A person of skill in the art would understand that, based on this disclosure, other schemes can similarly be used to prevent certain portions of a received signal (e.g., touch signal) from affecting a mixed signal resulting from mixing the received signal with a demodulation waveform.

In some examples, the device can detect tonal noise, determine a frequency of the tonal noise (in some examples, determine the times of rising and falling edges in the tonal noise), and adjust the dynamic demodulation waveform based on the determined frequency of the tonal noise. For example, the device can set values for T1-T4 based on the determined frequency of the tonal noise so as to reduce the probability that a rising or falling edge in the tonal noise will coincide with a non-zero value of the dynamic demodulation frequency. In some examples, the demodulation waveform can be dynamically adjusted or periodically adjusted to account for changes in the tonal noise.

Figure 5:
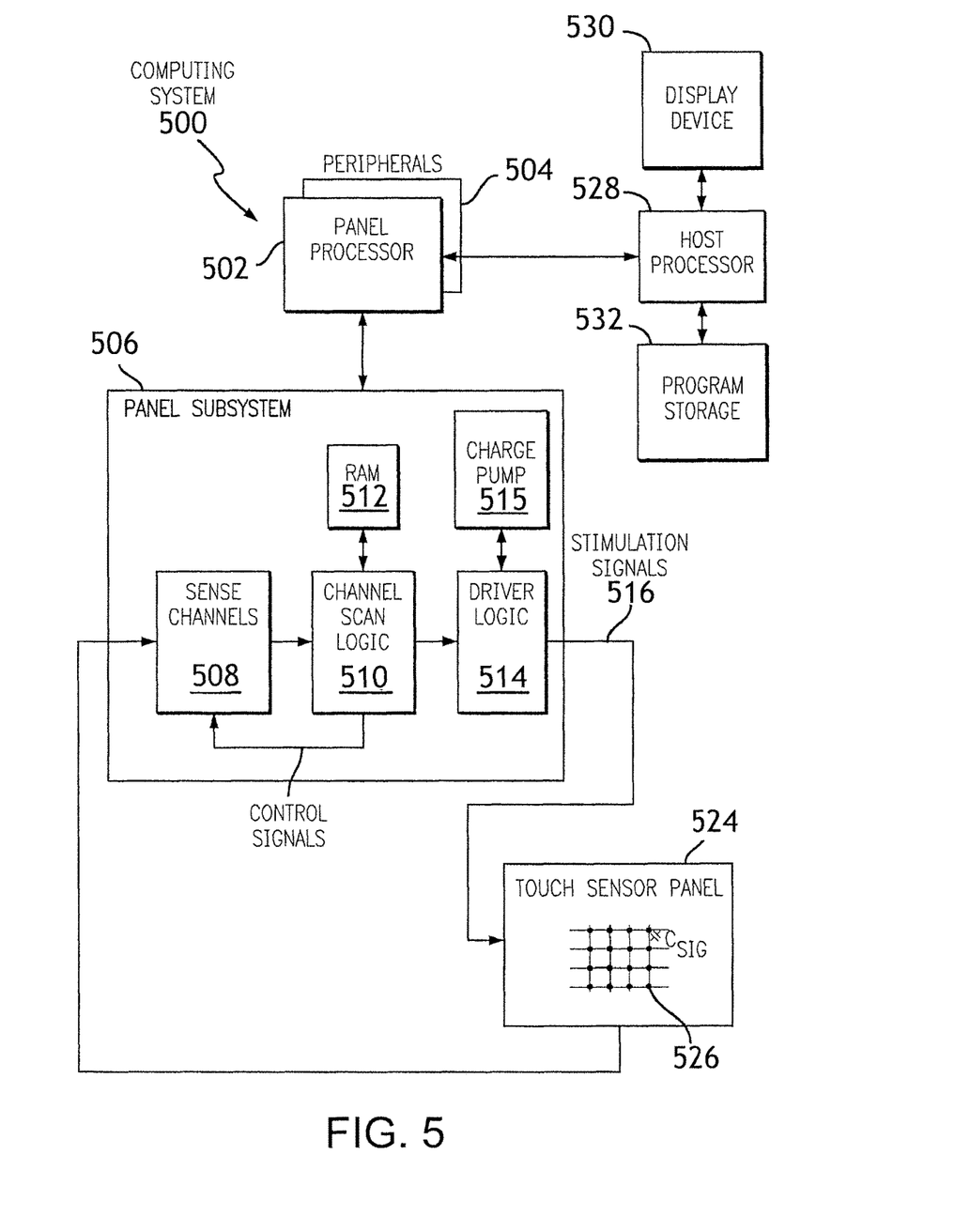
FIG. 5 illustrates an exemplary computing system that can include one or more of the examples described above.

FIG. 5 illustrates exemplary computing system 500 that can implement one or more of the examples described above. Computing system 500 can include one or more panel processors 502 and peripherals 504, and panel subsystem 506. Panel subsystem 506 can be referred to as a "touch controller." Peripherals 504 can include, but are not limited to, random access memory (RAM) or other types of memory or storage, watchdog timers and the like. Panel subsystem 506 can include, but is not limited to, one or more sense channels 508, which can utilize operational amplifiers that can be configured to minimize saturation time, channel scan logic 510 and driver logic 514. In some examples, sense channels 508 can include sense circuitry described in this disclosure, such as sense circuitry 230. Channel scan logic 510 can access RAM 512, autonomously read data from the sense channels and provide control for the sense channels including calibrating the sense channels for changes in phase correlated with a parasitic capacitance. In some examples, channel scan logic 510 can facilitate adjustment of the dynamic demodulation waveform of the disclosure, as described above. In addition, channel scan logic 510 can control driver logic 514 to generate stimulation signals 516 at various frequencies and phases that can be selectively applied to drive lines of touch sensor panel 524. In some examples, driver logic 514 can include stimulation circuitry as described in this disclosure, such as stimulation circuitry 202. In some examples, panel subsystem 506, panel processor 502 and peripherals 504 can be integrated into a single application specific integrated circuit (ASIC). In some examples, panel subsystem 506 and panel processor 502 can together be referred to as a "touch controller." In some examples, panel processor 502 can facilitate adjustment of the dynamic demodulation waveform of the disclosure, as described above.

Touch sensor panel 524 can include a capacitive sensing medium having a plurality of drive lines and a plurality of sense lines, although other sensing media can also be used. Each intersection of drive and sense lines can represent a capacitive sensing node and can be viewed as picture element (node) 526, which can be particularly useful when touch sensor panel 524 is viewed as capturing an "image" of touch. Each sense line of touch sensor panel 524 can drive sense channel 508 (also referred to herein as an event detection and demodulation circuit) in panel subsystem 506. The drive and sense lines can additionally or alternatively be configured to act as individual electrodes in a self-capacitance touch sensing configuration. Further, in some examples, touch sensor panel 524 can be a pixelated self-capacitance touch sensor panel.

Computing system 500 can also include host processor 528 for receiving outputs from panel processor 502 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/ or the like. Host processor 528 can also perform additional functions that may not be related to panel processing, and can be coupled to program storage 532 and display device 530 such as an LCD display for providing a UI to a user of the device. Display device 530 together with touch sensor panel 524, when located partially or entirely under the touch sensor panel, can form a touch screen.

Note that one or more of the functions described above can be performed by firmware stored in memory (e.g. one of the peripherals 504 in FIG. 5) and executed by panel processor 502, or stored in program storage 532 and executed by host processor 528. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (other than a "transport medium" defined below) that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 6A:
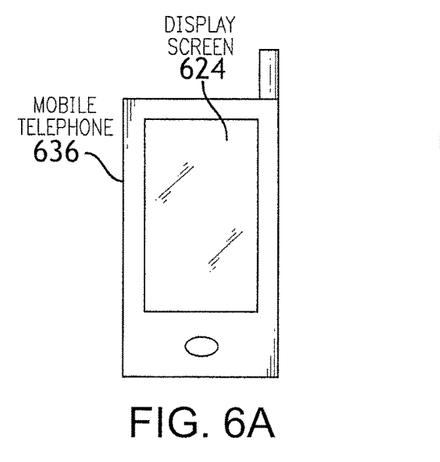
FIGS. 6a-d illustrate various electronic devices that can include one or more of the examples described above.

FIG. 6a illustrates exemplary mobile telephone 636 that can include touch screen 624 (e.g., a touch sensor panel and display device), the touch screen including circuitry to employ a dynamic demodulation waveform according to one disclosed example.

Figure 6B:
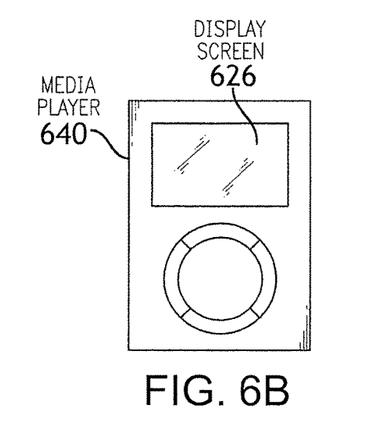

FIG. 6b illustrates exemplary digital media player 640 that can include touch screen 626 (e.g., a touch sensor panel and display device), the touch screen including circuitry employ a dynamic demodulation waveform according to one disclosed example.

Figure 6C:
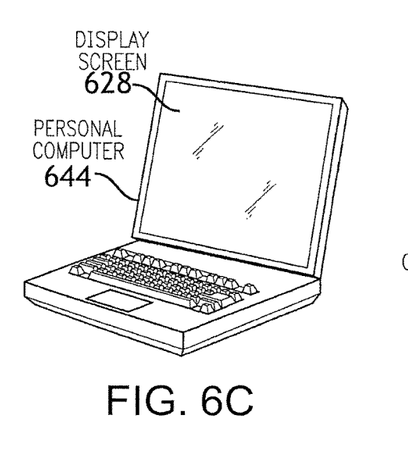

FIG. 6c illustrates exemplary personal computer 644 that can include touch screen 628 (e.g., a touch sensor panel and display), the touch sensor panel and/or display of the personal computer (in examples where the display is part of a touch screen) including circuitry to employ a dynamic demodulation waveform according to one disclosed example.

Figure 6D:
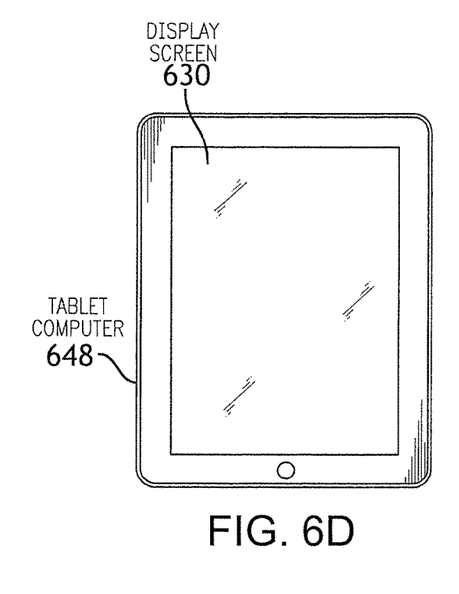

FIG. 6d illustrates exemplary tablet computer 648 that can include touch screen 630 (e.g., a touch sensor panel and display screen), the touch sensor panel and/or display of the tablet computer (in examples where the display is part of a touch screen) including circuitry employ a dynamic demodulation waveform according to one disclosed example. The mobile telephone, media player, personal computer and tablet computer of FIGS. 6a-d can reduce the adverse effects of tonal noise on the detection of touch.

Although FIGS. 6a-d discuss a mobile telephone, a media player, a personal computer and a tablet computer, respectively, the disclosure is not so restricted, and the touch sensor panel of the disclose can be included in a television or any other device, such as a wearable device, which can benefit from the reduction of adverse effects on the detection of touch caused by a tonal noise source.

Therefore, according to the above, some examples of the disclosure are directed to a touch controller comprising: a processor capable of: generating an adjustable demodulation waveform; mixing the adjustable demodulation waveform with a received signal to produce a mixed signal; determining a characteristic of the received signal; adjusting the demodulation waveform based on the determined characteristic of the received signal, wherein adjusting the demodulation waveform comprises, based on the determined characteristic of the received signal, selectively preventing the mixed signal from being affected by the received signal; and using the mixed signal to determine a touch. Additionally or alternatively to one or more of the examples disclosed above, in some examples, the determined characteristic of the received signal comprises a characteristic of a noise source. Additionally or alternatively to one or more of the examples disclosed above, in some examples, the noise source comprises a tonal noise source. Additionally or alternatively to one or more of the examples disclosed above, in some examples, the touch controller further comprises sense circuitry configured to sense a touch signal on a touch sensor panel, wherein the received signal comprises the touch signal. Additionally or alternatively to one or more of the examples disclosed above, in some examples, the sense circuitry is configured to sense the touch signal from a sense line of a mutual capacitance touch sensor panel. Additionally or alternatively to one or more of the examples disclosed above, in some examples, the sense circuitry is configured to sense the touch signal from a self-capacitance touch electrode of a self-capacitance touch sensor panel. Additionally or alternatively to one or more of the examples disclosed above, in some examples, selectively preventing the mixed signal from being affected by the received signal comprises turning off the demodulation waveform for one or more durations. Additionally or alternatively to one or more of the examples disclosed above, in some examples, the one or more durations are durations during which the demodulation waveform has signal energy lower than a signal energy at other durations. Additionally or alternatively to one or more of the examples disclosed above, in some examples, the one or more durations coincide with one or more transitional voltages in a noise source. Additionally or alternatively to one or more of the examples disclosed above, in some examples, the processor is further capable of determining a frequency of the noise source, and adjusting the demodulation waveform based on the determined characteristic of the received signal comprises adjusting the demodulation waveform based on the determined frequency of the noise source.

Some examples of the disclosure are directed to a method of demodulating a signal, the method comprising: generating an adjustable demodulation waveform; mixing the adjustable demodulation waveform with a received signal to produce a mixed signal; determining a characteristic of the received signal; adjusting the demodulation waveform based on the determined characteristic of the received signal, wherein adjusting the demodulation waveform comprises, based on the determined characteristic of the received signal, selectively preventing the mixed signal from being affected by the received signal; and using the mixed signal to determine a touch. Additionally or alternatively to one or more of the examples disclosed above, in some examples, the determined characteristic of the received signal comprises a characteristic of a noise source. Additionally or alternatively to one or more of the examples disclosed above, in some examples, the noise source comprises a tonal noise source. Additionally or alternatively to one or more of the examples disclosed above, in some examples, the method further comprises sensing a touch signal on a touch sensor panel, wherein the received signal comprises the touch signal. Additionally or alternatively to one or more of the examples disclosed above, in some examples, sensing the touch signal comprises sensing the touch signal from a sense line of a mutual capacitance touch sensor panel. Additionally or alternatively to one or more of the examples disclosed above, in some examples, sensing the touch signal comprises sensing the touch signal from a self-capacitance touch electrode of a self-capacitance touch sensor panel. Additionally or alternatively to one or more of the examples disclosed above, in some examples, selectively preventing the mixed signal from being affected by the received signal comprises turning off the demodulation waveform for one or more durations. Additionally or alternatively to one or more of the examples disclosed above, in some examples, the one or more durations are durations during which the demodulation waveform has signal energy lower than a signal energy at other durations. Additionally or alternatively to one or more of the examples disclosed above, in some examples, the one or more durations coincide with one or more transitional voltages in a noise source. Additionally or alternatively to one or more of the examples disclosed above, in some examples, the method further comprises determining a frequency of the noise source, wherein adjusting the demodulation waveform based on the determined characteristic of the received signal comprises adjusting the demodulation waveform based on the determined frequency of the noise source.

Some examples of the disclosure are directed to a non-transitory computer readable storage medium having stored thereon a set of instructions for generating a dynamically adjustable demodulation waveform on a touch sensor panel, that when executed by a processor causes the processor to: generate an adjustable demodulation waveform; mix the adjustable demodulation waveform with a received signal to produce a mixed signal; determine a characteristic of the received signal; adjust the demodulation waveform based on the determined characteristic of the received signal, wherein adjusting the demodulation waveform comprises, based on the determined characteristic of the received signal, selectively preventing the mixed signal from being affected by the received signal; and using the mixed signal to determine a touch. Additionally or alternatively to one or more of the examples disclosed above, in some examples, the determined characteristic of the received signal comprises a characteristic of a noise source. Additionally or alternatively to one or more of the examples disclosed above, in some examples, the instructions further cause the processor to: determine a frequency of the noise source, wherein adjusting the demodulation waveform based on the determined characteristic of the received signal comprises adjusting the demodulation waveform based on the determined frequency of the noise source. Additionally or alternatively to one or more of the examples disclosed above, in some examples, selectively preventing the mixed signal from being affected by the received signal comprises turning off the demodulation waveform for one or more durations. Additionally or alternatively to one or more of the examples disclosed above, in some examples, the one or more durations coincide with one or more transitional voltages in a noise source.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A touch controller comprising:
   a processor capable of:
   generating a demodulation waveform;
   determining a characteristic of a received signal from sense circuitry configured to sense a touch sensor panel;
   adjusting the demodulation waveform to generate an adjusted demodulation waveform based on the determined characteristic of the received signal, wherein adjusting the demodulation waveform, based on the determined characteristic of the received signal comprises turning off the demodulation waveform for one or more durations within each period of the adjusted demodulation waveform and turning on the demodulation waveform for a remainder of each period;
   mixing the adjusted demodulation waveform with a second received signal to produce a mixed signal; and
   using the mixed signal to determine a touch at the touch sensor panel.

2. The touch controller of claim 1, wherein the determined characteristic of the received signal comprises a characteristic of a noise source.

3. The touch controller of claim 2, wherein the noise source comprises a tonal noise source.

4. The touch controller of claim 1, further comprising:
the sense circuitry coupled to the processor, wherein the sense circuitry is configured to sense a touch signal from the touch sensor panel and wherein the received signal comprises the touch signal.

5. The touch controller of claim 4, wherein the sense circuitry is configured to sense the touch signal from a sense line of a mutual capacitance touch sensor panel.

6. The touch controller of claim 4, wherein the sense circuitry is configured to sense the touch signal from a self-capacitance touch electrode of a self-capacitance touch sensor panel.

7. The touch controller of claim 1, wherein the one or more durations are durations during which the demodulation waveform has signal energy lower than a signal energy at other durations.

8. The touch controller of claim 1, wherein the one or more durations coincide with one or more transitional voltages in a noise source.

9. The touch controller of claim 2, wherein:
the processor is further capable of determining a frequency of the noise source, and
adjusting the demodulation waveform based on the determined characteristic of the received signal comprises adjusting the demodulation waveform based on the determined frequency of the noise source.

10. A method of demodulating a signal, the method comprising:
generating a demodulation waveform;
determining a characteristic of a received signal from sense circuitry configured to sense a touch sensor panel, wherein the determined characteristic of the received signal comprises a characteristic of a tonal noise source;
adjusting the demodulation waveform to generate an adjusted demodulation waveform based on the determined characteristic of the received signal, wherein adjusting the demodulation waveform, based on the determined characteristic of the received signal comprises turning off the demodulation waveform for one or more durations within each period of the adjusted demodulation waveform and turning on the demodulation waveform for a remainder of each period;
mixing the adjusted demodulation waveform with a second received signal to produce a mixed signal; and
using the mixed signal to determine a touch at the touch sensor panel.

11. The method of claim 10, further comprising sensing a touch signal from the touch sensor panel, wherein the received signal comprises the touch signal.

12. The method of claim 11, wherein sensing the touch signal comprises sensing the touch signal from a sense line of a mutual capacitance touch sensor panel.

13. The method of claim 11, wherein sensing the touch signal comprises sensing the touch signal from a self-capacitance touch electrode of a self-capacitance touch sensor panel.

14. The method of claim 10, wherein the one or more durations are durations during which the demodulation waveform has signal energy lower than a signal energy at other durations.

15. The method of claim 10, wherein the one or more durations coincide with one or more transitional voltages in a noise source.

16. The method of claim 10, further comprising determining a frequency of the noise source, wherein adjusting the demodulation waveform based on the determined characteristic of the received signal comprises adjusting the demodulation waveform based on the determined frequency of the noise source.

17. A non-transitory computer readable storage medium having stored thereon a set of instructions for demodulating a signal, that when executed by a processor causes the processor to:
generate a demodulation waveform;
determine a characteristic of a received signal from sense circuitry configured to sense a touch sensor panel;
adjust the demodulation waveform to generate an adjusted demodulation waveform based on the determined characteristic of the received signal, wherein adjusting the demodulation waveform, based on the determined characteristic of the received signal comprises turning off the demodulation waveform for one or more durations within each period of the adjusted demodulation waveform and turning on the demodulation waveform for a remainder of each period;
mix the adjusted demodulation waveform with a second received signal to produce a mixed signal; and
use the mixed signal to determine a touch at the touch sensor panel.

18. The computer readable storage medium of claim 17, wherein the determined characteristic of the received signal comprises a characteristic of a noise source.

19. The computer readable storage medium of claim 18, wherein the instructions further cause the processor to:
determine a frequency of the noise source, wherein adjusting the demodulation waveform based on the determined characteristic of the received signal comprises adjusting the demodulation waveform based on the determined frequency of the noise source.

20. The computer readable storage medium of claim 17, wherein the one or more durations coincide with one or more transitional voltages in a noise source.

21. The computer readable storage medium of claim 18, wherein the noise source comprises a tonal noise source.

22. The computer readable storage medium of claim 18, wherein the instructions further cause the processor to:
sense a touch signal from the touch sensor panel, wherein the received signal comprises the touch signal.

23. The computer readable storage medium of claim 17, wherein the one or more durations are durations during which the demodulation waveform has signal energy lower than a signal energy at other durations.

\* \* \* \* \*